US009361640B1

(12) United States Patent
Donsbach et al.

(10) Patent No.: US 9,361,640 B1
(45) Date of Patent: Jun. 7, 2016

(54) METHOD AND SYSTEM FOR EFFICIENT ORDER PLACEMENT

(75) Inventors: Aaron M. Donsbach, Seattle, WA (US); Keith L. Frost, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1713 days.

(21) Appl. No.: 11/865,442

(22) Filed: Oct. 1, 2007

(51) Int. Cl.
*G06Q 30/00* (2012.01)
*G06Q 30/06* (2012.01)

(52) U.S. Cl.
CPC ........ *G06Q 30/0625* (2013.01); *G06Q 30/0633* (2013.01)

(58) Field of Classification Search
CPC .................. G06Q 30/0633; G06Q 3/0625
USPC .......... 705/26, 27, 26.1, 26.62, 26.8; 707/737
See application file for complete search history.

(56) References Cited

U.S. PATENT DOCUMENTS

| | | | |
|---|---|---|---|
| 5,933,818 A | 8/1999 | Kasravi et al. | |
| 6,029,195 A | 2/2000 | Herz | |
| 6,356,879 B2 | 3/2002 | Aggarwal et al. | |
| 6,438,579 B1 | 8/2002 | Hosken | |
| 6,493,702 B1 | 12/2002 | Adar et al. | |
| 6,598,026 B1* | 7/2003 | Ojha ................ | G06Q 30/0633 705/1.1 |
| 6,611,814 B1 | 8/2003 | Lee et al. | |
| 6,801,909 B2 | 10/2004 | Delgado et al. | |
| 6,912,505 B2 | 6/2005 | Linden et al. | |
| 7,051,048 B2 | 5/2006 | Sohma et al. | |
| 7,080,059 B1 | 7/2006 | Poston et al. | |
| 7,120,595 B2* | 10/2006 | Alexander ............. | G06Q 30/02 705/26.64 |
| 7,343,365 B2* | 3/2008 | Farnham ................ | G06F 3/0481 707/737 |
| 7,533,093 B2 | 5/2009 | Gutta et al. | |
| 7,668,821 B1 | 2/2010 | Donsbach et al. | |
| 7,689,457 B2 | 3/2010 | Chan et al. | |
| 7,698,335 B1* | 4/2010 | Vronay ............. | G06F 17/30038 707/737 |
| 7,747,626 B2* | 6/2010 | Grimm ................ | G06F 17/3071 707/712 |
| 7,996,282 B1* | 8/2011 | Scott ...................... | G06Q 30/06 705/27.1 |
| 2001/0042064 A1* | 11/2001 | Davis ................ | G06F 17/30864 705/26.1 |
| 2001/0044758 A1* | 11/2001 | Talib .................. | G06F 17/30622 705/26.1 |
| 2002/0174119 A1* | 11/2002 | Kummamuru ...... | G06F 17/3071 |
| 2002/0184139 A1 | 12/2002 | Chickering et al. | |
| 2003/0037041 A1* | 2/2003 | Hertz ................. | G06F 17/30867 |

(Continued)

FOREIGN PATENT DOCUMENTS

WO 2008121872 A1 10/2008
WO 2008121884 A1 10/2008

OTHER PUBLICATIONS

Feb. 1, 2003—http://www.cs.umd.edu/~samir/498/Amazon-Recommendations.pdf.*

(Continued)

*Primary Examiner* — Matthew Zimmerman
(74) *Attorney, Agent, or Firm* — Athorus, PLLC

(57) ABSTRACT

Methods and systems are described for providing efficient product ordering of products, such as groceries or any other product or item. The customer enters keywords (or generic terms) that describe a desired item on a first portion of a display screen and search result items associated with each of the keywords on the list automatically appear on a second portion of the display screen. When the customer selects the desired items from the second portion of the display screen, the selected items automatically appear on a third portion of the display screen. The customer can then click a "Check Out" button on the same screen and have the products shipped to him/her.

23 Claims, 8 Drawing Sheets

(56) References Cited

U.S. PATENT DOCUMENTS

| | | |
|---|---|---|
| 2003/0097196 A1 | 5/2003 | Gutta et al. |
| 2003/0105682 A1 | 6/2003 | Dicker et al. |
| 2003/0145277 A1* | 7/2003 | Neal ................ G06F 17/30994 715/273 |
| 2003/0158793 A1 | 8/2003 | Takakura et al. |
| 2003/0172357 A1 | 9/2003 | Kao et al. |
| 2003/0179236 A1 | 9/2003 | Good et al. |
| 2004/0093321 A1 | 5/2004 | Roustant et al. |
| 2004/0177009 A1* | 9/2004 | Schrenk ............ G06F 17/30864 705/26.62 |
| 2004/0249723 A1* | 12/2004 | Mayer ................ G06Q 30/0601 705/80 |
| 2005/0102202 A1 | 5/2005 | Linden et al. |
| 2005/0114324 A1* | 5/2005 | Mayer ................ G06F 17/30991 |
| 2005/0119948 A1* | 6/2005 | Musgrove ............. G06Q 30/06 705/26.62 |
| 2005/0256866 A1 | 11/2005 | Lu et al. |
| 2005/0256867 A1 | 11/2005 | Walther et al. |
| 2006/0020614 A1 | 1/2006 | Kolawa et al. |
| 2006/0041548 A1 | 2/2006 | Parsons et al. |
| 2006/0259344 A1 | 11/2006 | Patel et al. |
| 2007/0016575 A1 | 1/2007 | Hurst-Hiller et al. |
| 2007/0022020 A1* | 1/2007 | Bernstein ........... G06Q 30/0601 705/26.1 |
| 2007/0032244 A1 | 2/2007 | Counts et al. |
| 2007/0043688 A1 | 2/2007 | Kountz et al. |
| 2007/0078832 A1 | 4/2007 | Ott, IV et al. |
| 2007/0192308 A1 | 8/2007 | Wei et al. |
| 2008/0005064 A1 | 1/2008 | Sarukkai |
| 2008/0077569 A1* | 3/2008 | Lee .................. G06F 17/30713 |
| 2008/0189733 A1 | 8/2008 | Apostolopoulos |

OTHER PUBLICATIONS

International Search Report for International Publication No. WO 2008/121884 A1 dated Aug. 22, 2008 (1 page).
Written Opinion for International Publication No. WO 2008/121884 A1 dated Aug. 22, 2008 (6 pages).
International Search Report for International Publication No. WO 2008/121872 A1 dated Aug. 18, 2008 (1 page).
Written Opinion for International Publication No. WO 2008/121872 A1 dated Aug. 18, 2008 (6 pages).
Nairn, Agnes; Paul Bottomley,. "Something approaching science? Cluster analysis procedures in the CRM era. (Customer Relationship Management)." International Journal of Market Research. Jun. 2003. Retrieved Apr. 30, 2010 from accessmylibrary: http://www.accessmylibrary.com/article-1G1-111645962/something-approaching-science-cluster.html.
Schafer et al., "E-Commerce Recommendation Applications," Data Mining and Knowledge Discovery, Jan. 2001, vol. 5, Nos. 1-2, pp. 115-153.
U.S. Appl. No. 11/694,757 entitled "Processes for Calculating Item Distances and Performing Item Clustering" filed Mar. 30, 2007.
U.S. Appl. No. 11/694,707 entitled "Cluster-Based Assessment of User Interests" filed Mar. 30, 2007.
U.S. Appl. No. 11/694,675 entitled "Method and System for Selecting and Displaying Items" filed Mar. 30, 2007.
U.S. Appl. No. 11/693,063 entitled "Method and System for Providing Item Recommendations" filed Mar. 29, 2007.
U.S. Appl. No. 11/616,163 entitled "Method and System for Providing Suitable Replacement Items for On-Line Shopping" filed Dec. 26, 2006.

* cited by examiner

METHOD AND SYSTEM FOR EFFICIENT ORDER PLACEMENT

BACKGROUND

It is now commonplace for consumers (or customers or shoppers or buyers) to purchase goods or products from client-server based (or on-line or e-commerce or Internet-based) retailers (or merchants). A large number of retailers have set up Internet web sites where consumers can shop for the products (or items or goods) that are available for sale, purchase the products desired, and have the products delivered to them. These products may be tangible goods, such as groceries, books, CDs, DVDs, tools, clothes, footwear, health/beauty items, hardware, office supplies, pet care products, auto care products, industrial supplies, or any other tangible goods that are physically delivered to the customer, or "digital" goods, such as electronic books, music, movies/videos, application software, or any other digital product that is downloaded, copied, transmitted or otherwise electronically transferred to the customer.

For consumable products or products that require replacement on a periodic basis, e.g., groceries or other consumable products, some customers have begun to order such items from various merchants via the Internet and have the items delivered to the customer, in hopes of saving time and money. The merchant websites for ordering such items typically requires the customer to go through several different screens to order each item. For example, to buy milk, the customer may type in the word "milk" in a search field and the website provides a list of all products. The customer then scrolls through all the milk products to find the desired milk product to order. The customer may then click on an associated product link to view the product details to ensure it is the correct product, add the product to the cart, and then repeat the above steps again for the next desired product. This process can be inefficient and time consuming for the customer.

Therefore, among other potential problems, the current ordering techniques do not meet the needs of many customers desiring to reduce time spent ordering groceries or other items. Accordingly, it would be desirable to have a system or method for ordering items that overcomes the limitations and inefficiencies of the conventional approaches, that, among other potential benefits, makes it more convenient and efficient for the customer to place orders for products.

DETAILED DESCRIPTION

As set forth in more detail below, the present disclosure is directed to methods and systems for efficient ordering of products, such as groceries or any other product or item. In particular, the customer can enter keyword or generic terms in a list window, e.g., for groceries—milk, bread, eggs, cookies, coffee, etc., and recommended items associated with each of the keywords on the list automatically appear in an adjacent product recommendations window on the same screen. The customer selects the desired products from the recommendations window and they appear in an adjacent cart window also on the same screen. The customer can then click a "Check Out" button and have the products shipped to him/her. Thus, the present disclosure allows the customer, among other things, to create a shopping list using keywords, much like he/she would write on a piece of paper, and be able to efficiently select and order the desired products without having to scroll through numerous screens to identify and select each of the products. As used herein the term "keyword" includes individual words or groupings of alphanumeric characters as well as strings of multiple words or groupings of alphanumeric characters that may include spaces, commas, dashes, slashes, ampersands, asterisks, percents, pound signs, @ signs, parenthesis, plus signs, brackets, underscores, colons, semicolons, question marks, quotations, exclamation points, tildes, apostrophes, quotation marks, or any other delimiter.

For example, when Mary desires to order groceries, she goes to the merchant's grocery screen and types in the word "milk" in a shopping list window and milk product recommendations appear in a product recommendations window in another section of the same screen showing various milk products including, powdered goat milk, low fat milk, frozen milk, chocolate milk, and hot chocolate. She selects the "add" button under powdered goat milk and this item appears in a cart window in another section of the same screen. Then she types in the word "cookies" in the shopping list window and product recommendations appear in the product recommendations window showing various cookie related products, including, organic peanut butter cookies, breakfast cookies, and fruit cookies. She selects the "add" button under fruit cookies, and this item appears in the cart window on the same screen. Then she types in the word "bread" in the shopping list window and product recommendations appear in the product recommendations window showing various bread related products, including, whole wheat bread, bread crumbs, bread mix, and bread cookies. She selects the "add" button under whole wheat bread, and this item appears in the cart window on the same screen. She then clicks a "Check Out" button on the same screen and these items are shipped to her.

Figure 1:
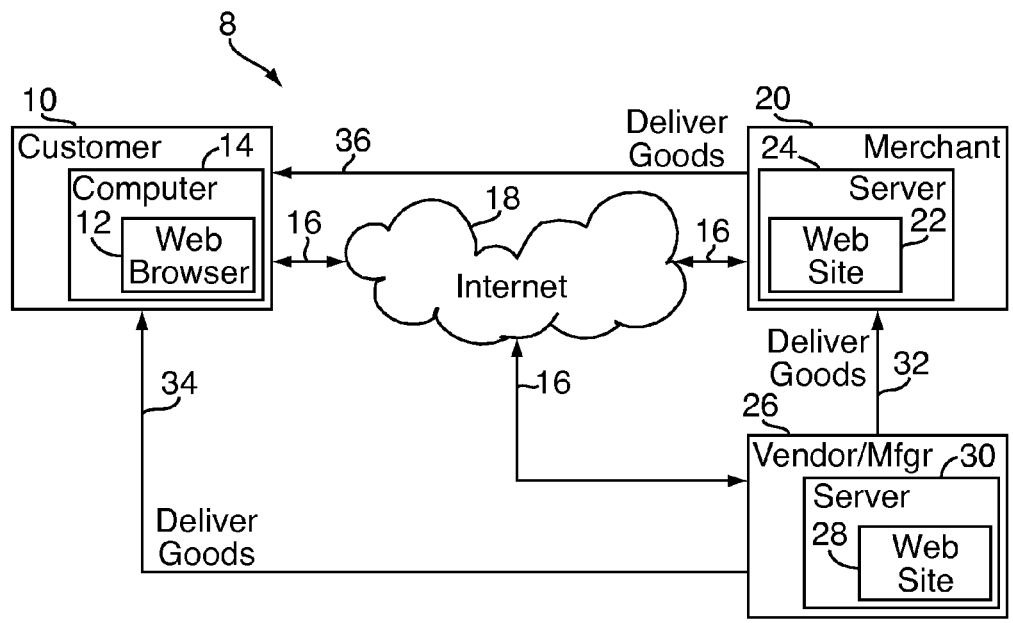
FIG. 1 is a block diagram of the components of a customer-merchant shopping system, in accordance with embodiments of the present disclosure.

FIG. 1 illustrates the various components of an embodiment of an interactive system, such as a customer-merchant client-server based ordering system 8, which includes a customer 10 (or user or consumer or client or shopper or buyer) and an e-commerce or Internet-based merchant (or supplier or retailer or seller or reseller or distributor) 20. The customer 10 can be any entity or individual that wishes to purchase, rent, lease, borrow, or otherwise obtain goods (or products) or services from the merchant 20. The customer 10 uses a client application, such as a web browser 12 running on a computer 14. The merchant 20 is an entity that sells, or otherwise provides items for purchase by customer 10, from a merchant website 22 which is implemented using one or more physical computer servers 24. The customer computer 14 is connected to or communicates with the merchant server 24 through a communications network 18, such as the Internet, as indicated by lines 16, by sending and receiving of digital data over the communications network 18. The customer 10 uses the web browser 12 as a user interface to view and/or communicate with the merchant website 22 that is displayed on the customer computer 14 allowing the customer 10 to interact with the merchant website 22.

In addition, one or more of the goods ordered by the customer 10 may be made by or obtained from one or more third party vendors (or manufacturers) 26. Also, the merchant 20 may be the vendor 26. The vendor 26 is an entity that manufactures goods or has access to goods that the merchant 20 desires to supply to the customer 10 and may sell the goods to the merchant 20 through a vendor website (or other type of order processor) 28, which is implemented using one or more physical computer servers 30. The vendor computer server 30 is connected to or communicates with the merchant server 24 and the customer computer 14, through the communications network 18, as indicated by lines 16. If used by the merchant 20, the vendor 26 may deliver the desired goods to either the merchant 20 or to the customer 10, as indicated by the lines 32,34, respectively. If the goods are delivered to the merchant 20 from the vendor 26, the merchant 20 delivers the goods to the customer, as indicated by a line 32. There may be more than one vendor 26 that supplies goods to the merchant 20 and/or the customer 10.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "merchant" or "vendor" refers to the associated computer systems operated or controlled by a merchant or vendor, respectively. Thus, process steps described as being performed by the "merchant" or the "vendor", may be automated steps performed by their respective computer systems. These steps are implemented within software modules (or computer programs) executed by one or more general purpose computers. For example, the web browser (or user interface) 12 may be implemented on the computer 14 using one or more software applications. Specially designed hardware could alternatively be used to perform certain operations. Process steps described as being performed by a "customer" are typically performed by a human operator via the computer 14, but could, alternatively, be performed by an automated agent.

The customer 10 may use any web-enabled or Internet applications, such as the web browser 12, or any other client-server applications or features including email, or other messaging techniques to communicate with (or connect to) the merchant web site 22 and/or server 24 through the communications network 18. In addition, the computer 14 may be any of a number of computing devices that are capable of communicating over the network, including but not limited to set-top boxes, personal digital assistants, mobile phones, digital media players, Web pads, tablets, laptop computers, desktop computers, electronic book readers, and the like. The protocols and components for providing communication between the customer computer 14 and the merchant website 22 and/or server 24 are well known to those skilled in the art of computer communications and thus, need not be described in more detail herein.

The data and/or computer executable instructions, programs, firmware, software and the like (also referred to herein as "computer executable components") described herein may be stored on a computer-readable medium that is within or accessible by the customer computer 14 and/or the server 24, having sequences of instructions which, when executed by a processor (or CPU), cause the processor to perform all or a portion of the functions and/or methods described herein. Such computer executable instructions, programs, software and the like may be loaded into the memory of the customer computer 14 or the server 24, using a drive mechanism associated with the computer readable medium, such as a floppy drive, CD-ROM drive, DVD-ROM drive, network interface, or the like.

In order to select one or more items, the customer 10 browses through information concerning goods (or products) or services available for purchase from the merchant 20. After selecting one or more product(s) or service(s) (collectively, "items") that the customer 10 wishes to obtain, an order is sent to the merchant 20. The order is placed via a communication from the web browser 12 to the web site 22 operating on the server 24 of the merchant 20, which includes payment by the customer 10 to the merchant 20 for the items. The merchant 20 then delivers the items to the customer 10 as indicated by the line 36. Alternatively, the vendor 26 may deliver the items directly to the customer 10 as indicated by the line 34.

For purposes of illustration, the systems and methods described herein will be described primarily in the context of a web site that provides functionality for users to browse and make purchases from an electronic catalog; however, as will be recognized, the disclosed systems and methods may also be used in numerous other environments.

Figure 2:
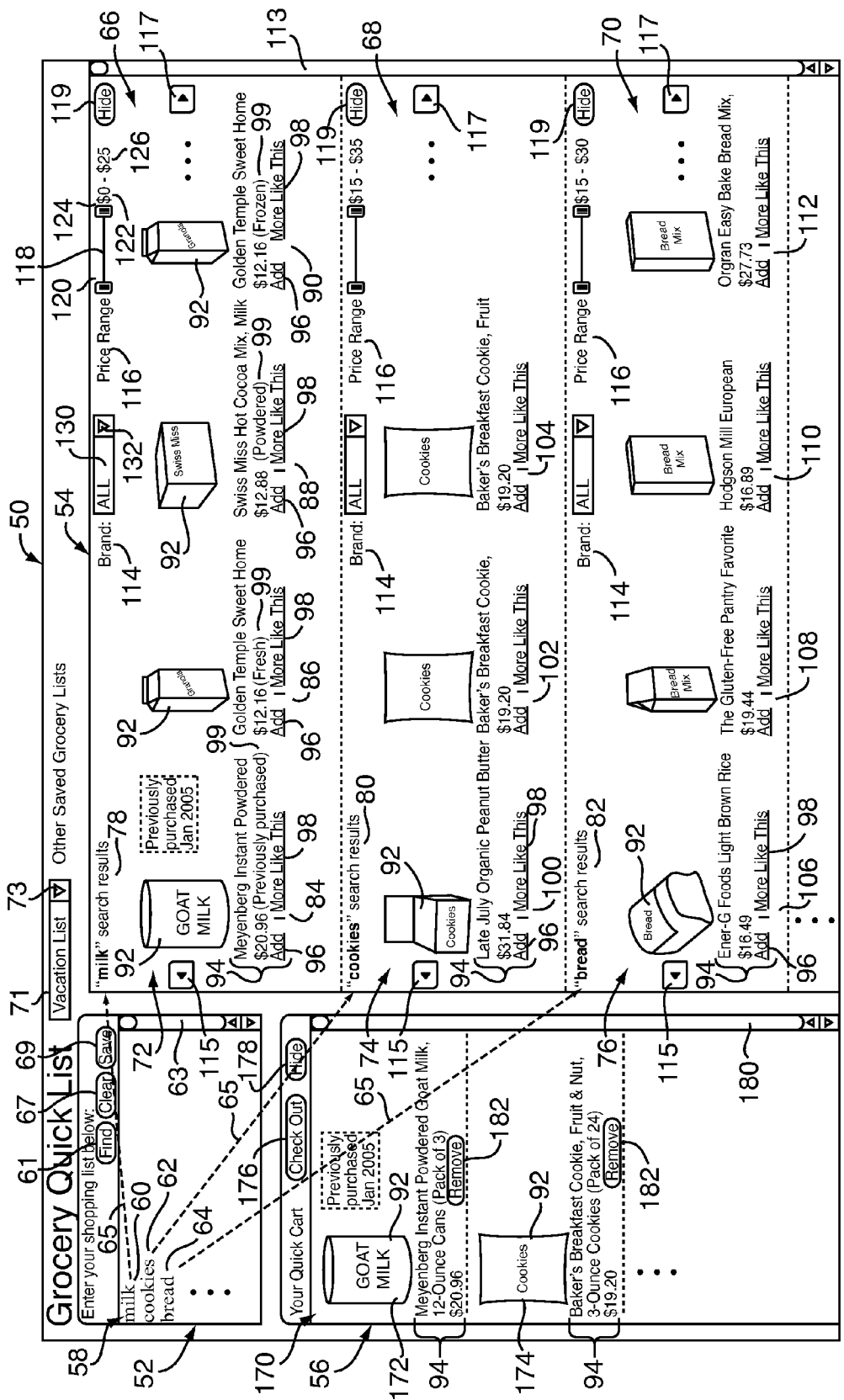
FIG. 2 is an illustration of a user interface showing a grocery list window, item recommendations window, and cart window, in accordance with embodiments of the present disclosure.

Referring to FIG. 2, a sample merchant website main grocery ordering user interface 50 (or graphical user interface (GUI), or window, or screen, or web page, or browser screen) for use by the customer 10 in selecting items for purchase from the merchant 20 via the web site 22 includes a shopping list user interface (or window or screen section) 52, an item recommendations (or results) user interface (or window or screen section) 54, and a cart list user interface (or window or screen section) 56. The windows 52-56 may be separate windows or may be displayed within a common window. Also, in the illustrated embodiment, the items featured on the website 22 and discussed with respect to the user interface 50 are representative samples of items and the scope of the disclosure is not limited in this regard as the system and method of the present disclosure can be utilized in connection with the marketing and sales of many other types of items as will be readily apparent to one skilled in the art.

The shopping list window 52, displays a list 58 of keywords (or generic terms) 60-64 that describe desired items, e.g., milk 60, cookies 62, and bread 64, entered by the customer 10, each keyword indicative of an item desired to be purchased by the customer 10. For the keywords 60-64 on the list 58 in the window 52, there are separate corresponding item recommendations (or results) viewers (or windows or screen sections) 66-70, respectively, that appear in the item recommendations window 54. Each of the viewers 66-70 shows lists 72-76, respectively, of recommended items related to the associated item name, as indicated by the dashed lines 65. For example, when the keyword "milk" 60 is entered on the list 58 in the shopping list window 52, the item recommendations viewer 66 appears in the item recommendations window 54 showing a list 72 of items 84-90 relating to milk (discussed more hereinafter). Similarly, when keyword "cookies" 62 is entered on the list 58 in the window 52, the item recommendations viewer 68 appears in the item recommendations window 54 showing items 100-104 relating to cookies. Also, when the keyword "bread" 64 is entered on the list 58 in the shopping list window 52, the item recommendations viewer 70 appears in the item recommendations window 54 showing items 106-112 relating to bread. For each additional keyword name entered on the list 58, a corresponding additional item recommendations viewer appears in the item recommendations window 54 showing specific recommended items relating to the associated item name.

The recommendation viewers 66-70 may appear upon the customer 10 pressing the "return" button on the keyboard of the customer computer 14, or upon selecting a find button 61 near the shopping list window 52, or any other technique that indicates to the merchant system to initiate a search for items related to the keywords in the list 58. Also, the keywords 60-64 may be separated by a predetermined separator, such as a carriage return. Other separators may be used, such as commas, periods, semicolons, or other characters or symbols that indicate a separation between the keywords and that are different from the characters or symbols that are allowed to be part of a keyword. Further, a scroll bar 63 may be provided to allow the customer 10 to scroll through the shopping list 58 in the window 52. Still further, the customer 10 may delete all entries by selecting a clear button 67 and may save the current list by selecting a save button 69. Also, a preexisting shopping list can be pasted into the window by selecting a list from the saved list field 71. When a drop down button 73 is selected, a list of previously stored lists appears (not shown) and the customer 10 selects a list which is then pasted into the list shopping list 58 and the name of the list appears in the field 71, e.g., "Vacation List".

For each of the items 84-90, 100-104, and 106-112 in the recommendations viewers 66-70, respectively, there is an item image (or icon) 92 displayed, as well as associated underlined text 94 of the item name and/or other information about the item, e.g., price, manufacturer, availability (e.g., in stock, out of stock, discontinued, etc.), shipping cost, discounts, and the like. Each of the images 92 and/or associated underlined text 94, may be a selectable link, which, when clicked on (or selected), brings the customer 10 to a page of the merchant website 22 that shows a product (or item) detail page (not shown) for the selected item. The item detail screen (not shown), as is known, may contain specific detailed information about the item corresponding to the item images 92 in the recommendations sections 66-70, including one or more of: Product Name, Images, Availability, Manufacturer, Price, Shipping information, Product Specifications and/or Features, and the like.

An "Add" (or "Add to Cart") button 96 is provided under each of the items 84-90, 100-104, 106-112, in the recommendations viewers 66-70, respectively, which, when selected, adds the corresponding item to a shopping cart window 56 (discussed more hereinafter). The items 84-90 in the viewer 66 may be search results returned for the keyword "milk", or they may be representative items that correspond to subcategories of products relating to the keyword "milk", e.g., fresh milk, powdered milk, frozen milk, etc., as indicated by a numeral 99. If the customer 10 has purchased any items relating to milk from this merchant in the past, one of the items 84-90, e.g., the first item 84, will be an item previously purchased by the customer 10 and may be indicative of a "previously purchased" category. In the event that the items 84-90, 100-104, 106-112, are representative items of a category of products, a "More Like This" button 98 is provided, which, when selected, replaces the associated viewer 66-70 with a viewer that show products in the same category (discussed more hereinafter).

If there are more than the predetermined maximum number of images, e.g., four, in the viewer 66 (e.g., there are more than four recommended items or categories of items from the keyword search), left and right scroll arrow buttons 115,117, respectively, may appear and the viewer 66 may become a "slide show" viewer. The maximum number of images in the viewer 66 may be any desired number, depending in part on the size of the images 84-90 and the size of the browser screen. When the customer 10 selects (clicks on or mouses over) the left scroll arrow button 115, the images 92 (and the associated item details 94) for the products 84-90 all scroll (or index or shift) to adjacent positions to the right, e.g., the item 90 disappears to the right, the item 88 moves to the position previously occupied by item 90, the item 86 image moves to the position previously occupied by the item 88, the image 84 moves to the position previously occupied by the item 86, and so on. When the first item 84 on the list 72 is displayed in the left-most (or first) position of the viewer 66, the images 92 of the items 84-90 may stop moving to the right, as the viewer 66 is at the left end of the list 72.

Similarly, if the customer 10 clicks on the right scroll button 117 the images 92 (and the associated item details 94) for the products 84-90 all scroll (or index or shift) to adjacent positions to the left. When the last item on the list 72 is displayed in the last position of the viewer 66, the items and corresponding images 92 may stop moving to the left, as the viewer 66 is at the right end of the list 72. Instead of an index-type scroll described above where there are preset positions for each image in the viewer 66, a smooth or continuous scroll may be used, in which case there are no fixed positions for the images 92 in each of the viewers 66 and the images 92 scroll smoothly as a group across the viewer 66 in the desired direction based on the selection of the scroll buttons 115,117. Also, the scroll buttons 115,117 may be located anywhere near the viewer 66. Optionally, selecting the left or right scroll buttons 115,117 may result in showing the next set of four items in the viewer 66. Also, a series of selectable page numbers (not shown) may be displayed in the viewer 66 to allow the customer 10 to scroll through the images in the viewer 66 a page at a time. The other viewers 68,70 may operate in a similar fashion to that described above for the viewer 66.

Also, within each of the item recommendations viewers 66-70, there may be a title line 78-82, respectively, that has at least the keyword from the shopping list 58, e.g., "milk", "cookies", "bread", and may also state: "search results". Also there may be one or more recommendation filters 114,116, wherein a customer 10 can select and/or input search criteria or features related to a product or product type for narrowing a search for the recommended products that appears in the viewers 66-70. In the illustrated embodiment, the recommendation filters include: a brand selector 114 and a price range selector 116. Also, the recommendations filters 114,116 may be interactive with each other, such that the viewers 66-70 associated with each of the recommendations filters 114,116 are updated in real time to reflect a selection made using the recommendations filters 114,116.

The price range selector 116 includes a sliding scale 118 having a minimum price slider 120 and corresponding minimum price identifier 122 as well as a maximum price slider 124 and corresponding maximum price identifier 126. The minimum and maximum price sliders 120,124 are operable by the customer 10 via dragging the sliders 120,124 with a mouse or other suitable device for interacting with the user interface (not shown) coupled to the computer 14 to limit the items displayed in the viewers 66-70 to those in a selected price range. For example, to display in the viewer 66 only items priced in a range between $8.50 and $21.00, the customer 10 moves the minimum price slider 120 towards the right side until the minimum price identifier 122 is set to $8.50. Similarly, the maximum price slider 124 is moved toward the left until the maximum price identifier 126 is set to $21. Thus, as the minimum and maximum price sliders 120, 124 are moved, the corresponding minimum and maximum price identifiers 122,126, respectively, are updated in the viewer in real time. The default position of the sliders 120,124 and the price identifiers 122,126 before adjustment by the customer 10 is the full range of prices of all products that are recommended by the system. Additionally, in response to changing the price range selector 116 as set forth above, the corresponding viewer 66-70 is also updated in real time to include item images for only the selected products within the price range selected via the price range selector 116.

Figure 3:
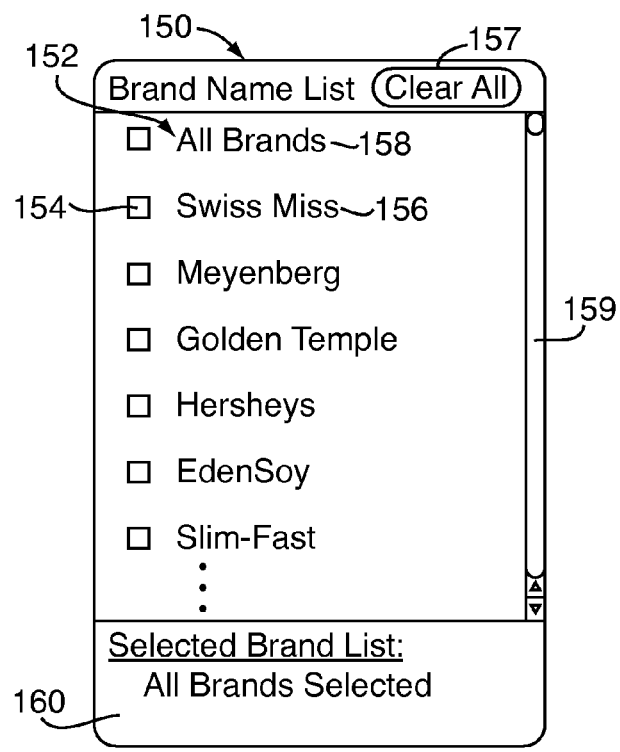
FIG. 3 is a screen illustration of Brand Name list, in accordance with embodiments of the present disclosure.

The brand selector 114 has a selected brand field 130, which identifies the brand names that are included in the search results displayed in recommendations viewers 66-70. If all brands are included, the brand field 130 indicates "ALL". If only certain selected brands are included, the brand field 130 indicates "SELECTED". When the customer 10 clicks on a drop-down (or pull-down) arrow 132, a drop-down list 150 appears as shown in FIG. 3, which shows a brand name list 152 of each of the brand names available for all recommended items associated with the corresponding keyword in the shopping list, and also shows which of the brands have been selected to be included in the recommended items shown in the viewers 66-70. In some embodiments, the list 150 may be a pop-over screen that appears when the customer 10 mouses over (or places the mouse over) the brand selector filter 114.

Referring to FIG. 3, a checkbox 154 located adjacent to each brand name 156 in the brand name list 152 is selectable via a mouse click to identify the brands of recommended items to be displayed in the corresponding viewer 66-70. Also, using a mouse pointer (not shown) operable via the computer 14, the customer 10 can select a brand name 156 included in the brand name list 152 by directing the mouse directly on the brand name 156 and clicking on the same. To deselect a selected brand name 156, a second mouse click on the checkbox 154 or brand name 156 will deselect the brand and cause the items shown corresponding viewer 66-70 to be updated accordingly. A check in the checkbox 154 indicates that the brand is included in the recommendations results displayed in one of the corresponding viewers 66-70 and the absence of a check indicates that the brand is not included in the viewer results. A check in the checkbox 154 for the All Brands entry 158, or the absence of the selection of any of the individual brands, indicates that all brands will be in the results. Optionally, there may be a scroll bar 159 provided to allow the customer 10 to scroll through the list 152. As shown in FIG. 2, the selected brands field 130 displays the word "ALL" as no individual brand names have been selected. Also, upon brand selection, the price selector 116 (discussed hereinbefore) is updated in real time to reflect the price range of all the recommended items that meet the brand selection.

One convenient feature of the brand selector 116 is that the customer 10 can select more than one brand name and only recommended items having the selected brands are displayed in the respective viewer 66-70. Also, there may be a "Clear All" button 157 which clears all the checkboxes. Further, a scroll bar 159 may be provided to allow the customer 10 to scroll through the brand list 152 in the window 150. Optionally, there may be a selected brand list section 160 as part of the window 150, which lists the brands currently selected from the brand list 152 above.

The price range selector 116 and/or the brand selector 114 may be similar to that described in copending U.S. patent application Ser. No. 11/694,675, entitled "Method and System for Selecting and Displaying Items", filed Mar. 30, 2007, which is incorporated by reference herein in its entirety.

Another recommendation filter that may be provided in the viewers 66-70 is an "attribute selector" (not shown), where the customer 10 may select various attributes that the product must have (or not have) to be included in the results shown in the recommendations viewers 66-70, e.g., age match, gender match, size match, pack size match, sugar free, vegan, caffeine free, fat free, organic, gluten free, artificial sweetener, low sodium, low cholesterol, low trans fat, etc.

A "Hide" button 119 is provided in the recommendations window 54, which, when selected, removes the item 84-90 and may leave only the search title line 78-82 and the brand and price selectors 114,116. When the "Hide" button 119 is pressed again, the items 84-90 reappear. Also, a scroll bar 113 may be provided to allow the customer 10 to scroll through all the recommendation viewers 66-70 in the window 54.

Under the shopping list window 52 is a cart window 56, which displays a list 170 of items 172,174 to be purchased that have been selected from the viewers 66-70. In particular, when the customer 10 selects the "Add" button 96 under an item in the viewers 66-70, the item is added to the cart 56. When the customer 10 is finished shopping, he can select the "Check Out" button 176 in the cart window 56 and the items in the cart are shipped to the customer 10. A "Hide" button 178 is provided to condense the list 170 in the window 56, which when selected, removes the item images and leaves only the product title 94. Then the "Hide" button is pressed again, the images reappear. Also, a scroll bar 180 is provided to allow the customer to scroll through all the items 172-174 on the list 170.

Also, the customer 10 may remove or delete items from the shopping list 58 at any time by using a delete key on the computer or highlighting the text and deleting it. In such a case, the corresponding viewer window 66-70 may be removed and no longer displayed. The cart window may retain the items added. The customer 10 may click a "Remove" button 182 to delete the corresponding item from the cart window 56.

It should be understood that the shopping list window 52, the recommendations window 54, and the cart window 56 may be located at any location in the screen 50 individually and relative to each other, and are not required to be in the locations shown in FIG. 2. Further, the windows may be movable by the customer by dragging the windows 52,54,56 to the desired locations within the window 50 based on customer preference. Also, the windows 50, 52, 54, 56 and the lists contained therein may be displayed on one or more separate screens or web pages. The number of screens and the number of items on each page depends on the format and content of the items list and the browser screen.

Figure 4:
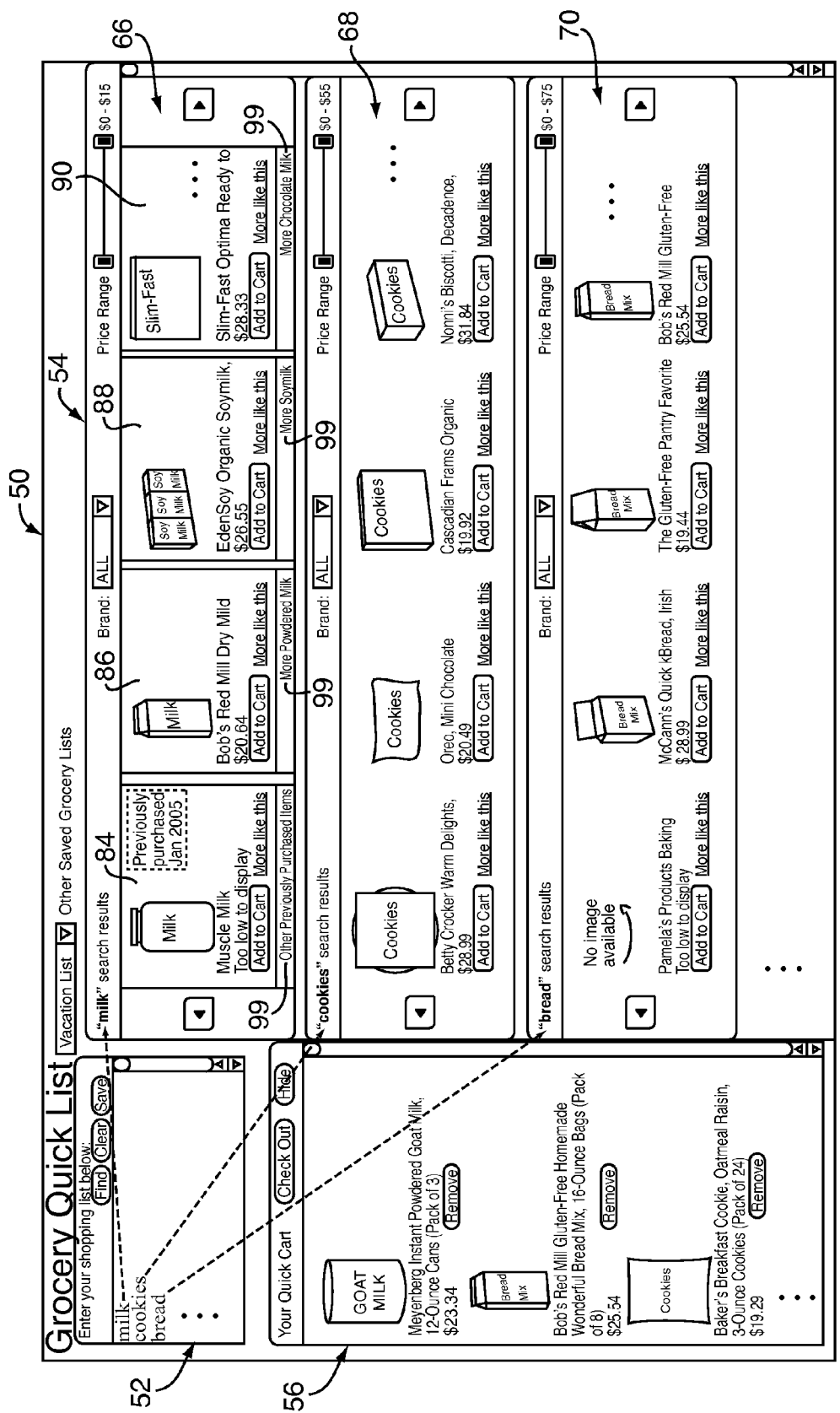
FIG. 4 is an illustration of a user interface showing a grocery list window, item recommendations window, and cart window, in accordance with embodiments of the present disclosure.
Figure 5:
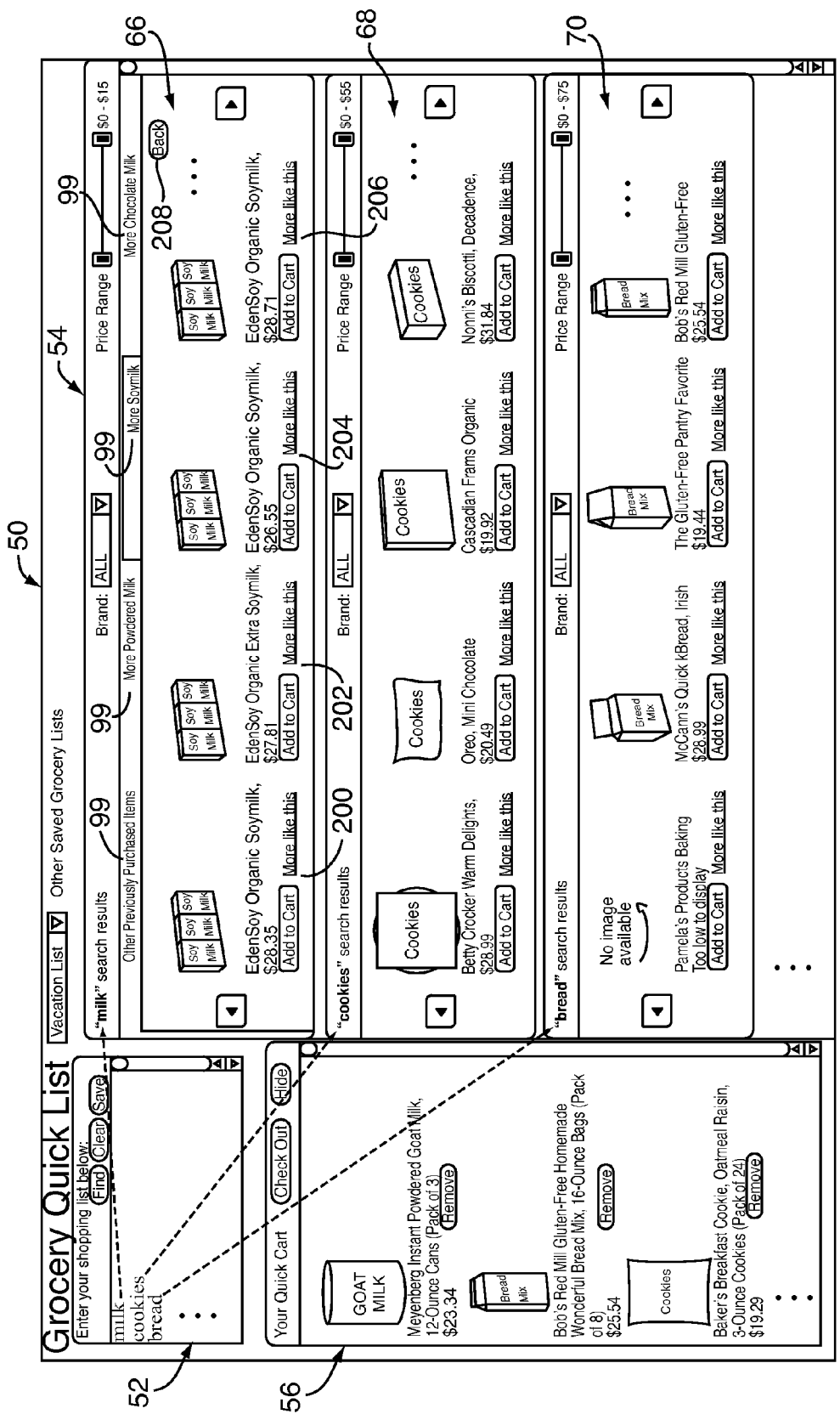
FIG. 5 is an illustration of a user interface showing a grocery list window, item recommendations window, and cart window, in accordance with embodiments of the present disclosure.

Referring to FIGS. 4 and 5, in an alternative embodiment of the present disclosure, the categories 99 may be as shown as tabs below the items 84-90 in the viewer 66. Referring to FIG.

5, when one of the category tabs 99 is selected, the images in the viewer 66 are replaced by images relating to items 200-206 in the selected category. When the customer 10 is finished viewing the category, e.g., more soymilk, a "Back" button 208 may be selected, which brings the display in the viewer 66 back to the prior set of images in the viewer 66 shown in FIG. 4.

Figure 6:
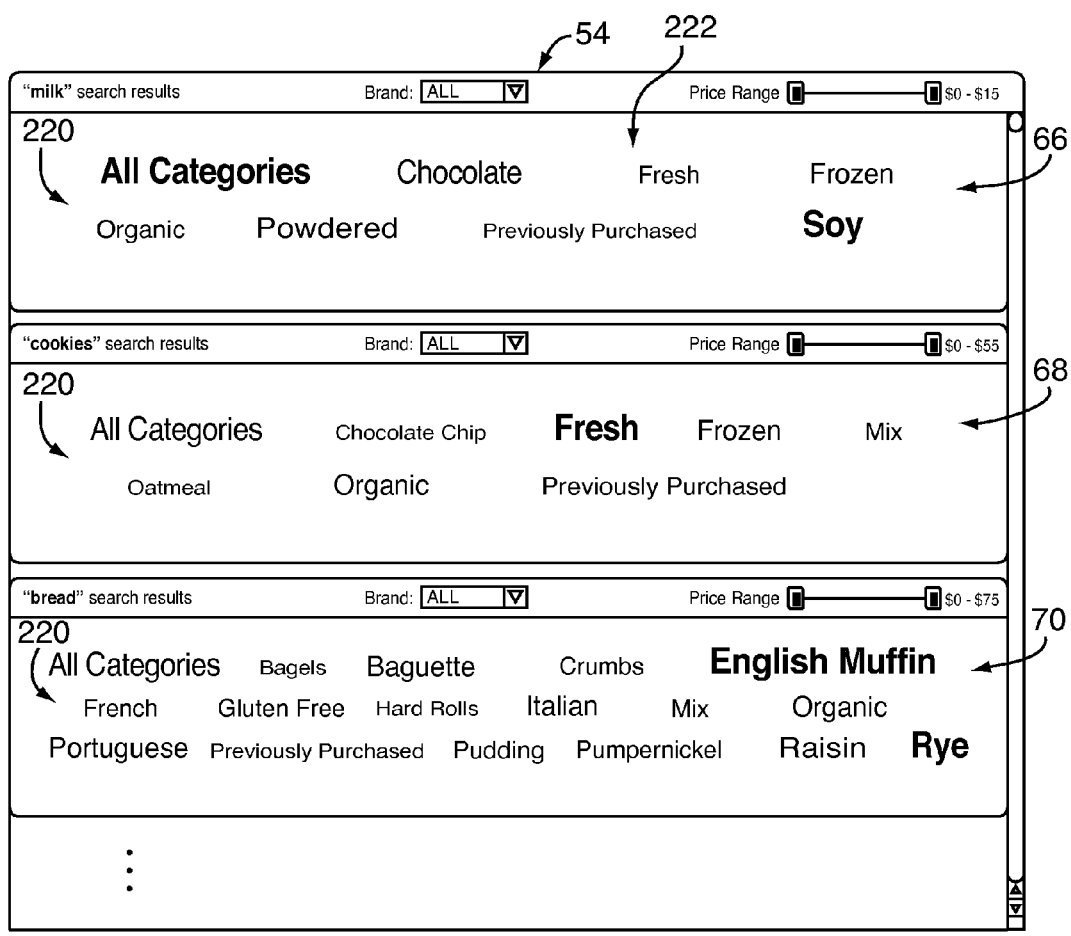
FIG. 6 is an illustration of a user interface showing an item recommendations window with a text cloud, in accordance with embodiments of the present disclosure.

Referring to FIG. 6, in some embodiments, the viewer 66 may be a text cloud 222 which displays a plurality of categories or clusters 220 in the viewer 66. In addition, the size of the text for each of the categories 220 may be indicative of the number of items in that category. When the customer 10 selects, or clicks on, one of the categories 220, the viewer 66 displays a slide show viewer of items such as that shown in the viewer 66 in FIG. 5 discussed hereinbefore, where the items displayed are related to the category selected. In such a case, when the customer 10 is finished viewing the items in that category, e.g., soy, the "Back" button 208 may be selected, which brings the display in the viewer 66 back to the text cloud in the viewer 66 shown in FIG. 6. Further, an "All Categories" category is provided, which, when selected, causes the viewer 66 to display items in all categories in a slide show viewer, and a "Previously Purchased" category is provided, which, when selected, causes the viewer 66 to display all items related to the selected keyword that have been previously purchased by the customer.

Figure 7:
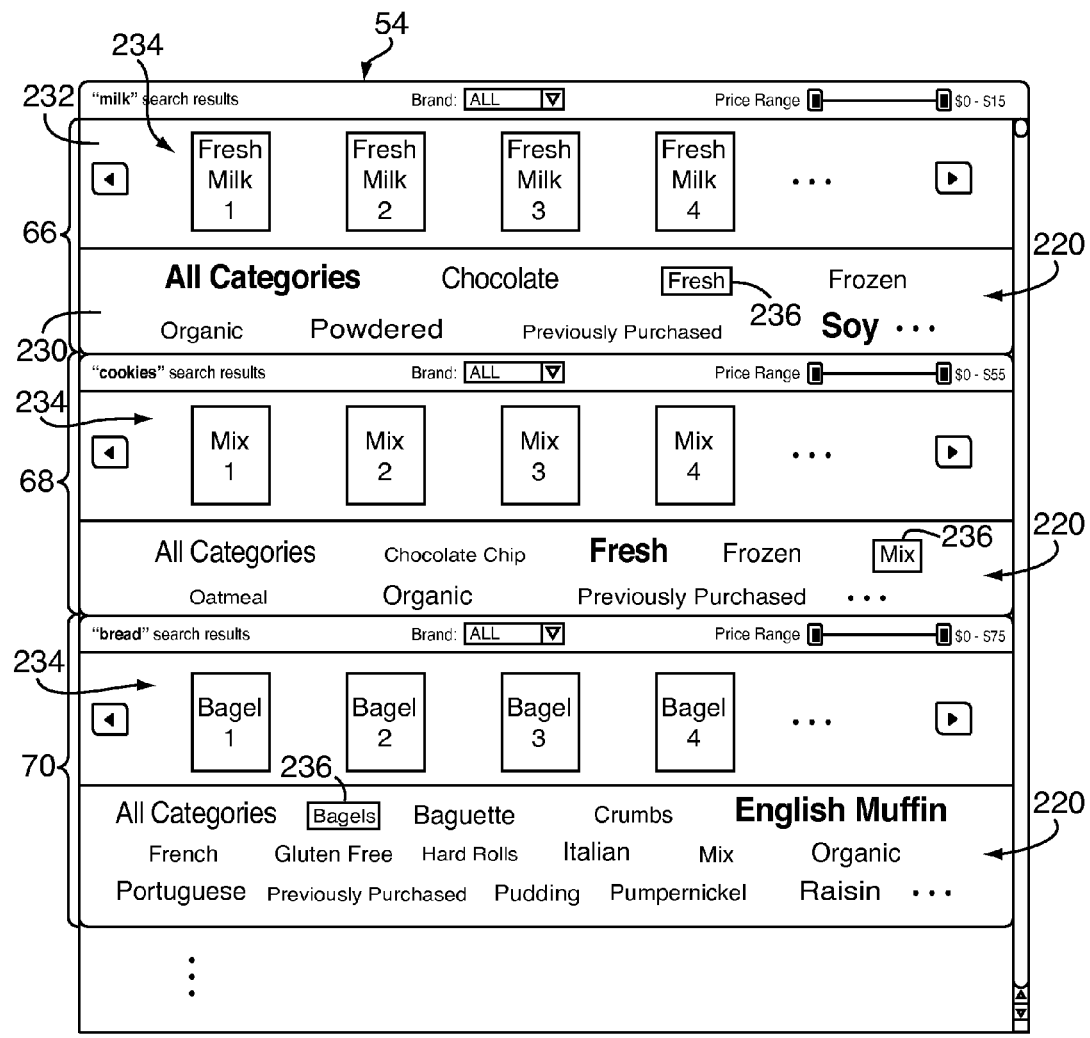
FIG. 7 is an illustration of a user interface showing an item recommendations window with a text cloud and slide show viewer, in accordance with embodiments of the present disclosure.

Referring to FIG. 7, in some embodiments, the viewer 66 may have a text cloud section 230 (like the cloud 222 shown in FIG. 6) and a slide show viewer section 232 (like the viewer 66 shown in FIGS. 3-5). In such a case, the customer 10 can view the item categories 220 in the text cloud 230 and also view a list of items 234 in a given category in the slide show viewer 232. For example, in the viewer 66, if the customer 10 selects the category, e.g., "Fresh", a box 236 is displayed around the selected category and the slide show viewer 232 shows items relating to the selected category ("Fresh") and to the keyword (milk), e.g., Fresh Milk items. The viewers 68,70 operate the same way as described above for the viewer 66.

The text clouds 222,230 (FIGS. 6,7) and corresponding slide show viewer 232 (FIG. 7) may be similar to that described in copending U.S. patent application Ser. No. 11/693,063, entitled "Method and System for Providing Item Recommendations", filed Mar. 29, 2007; Ser. No. 11/694,757, entitled "Processes For Calculating Item Distances and Performing Item Clustering", filed Mar. 30, 2007; and Ser. No. 11/694,707, entitled "Cluster-Based Assessment of User Interests", filed Mar. 30, 2007, each of which is incorporated herein by reference in its entirety.

Figure 8:
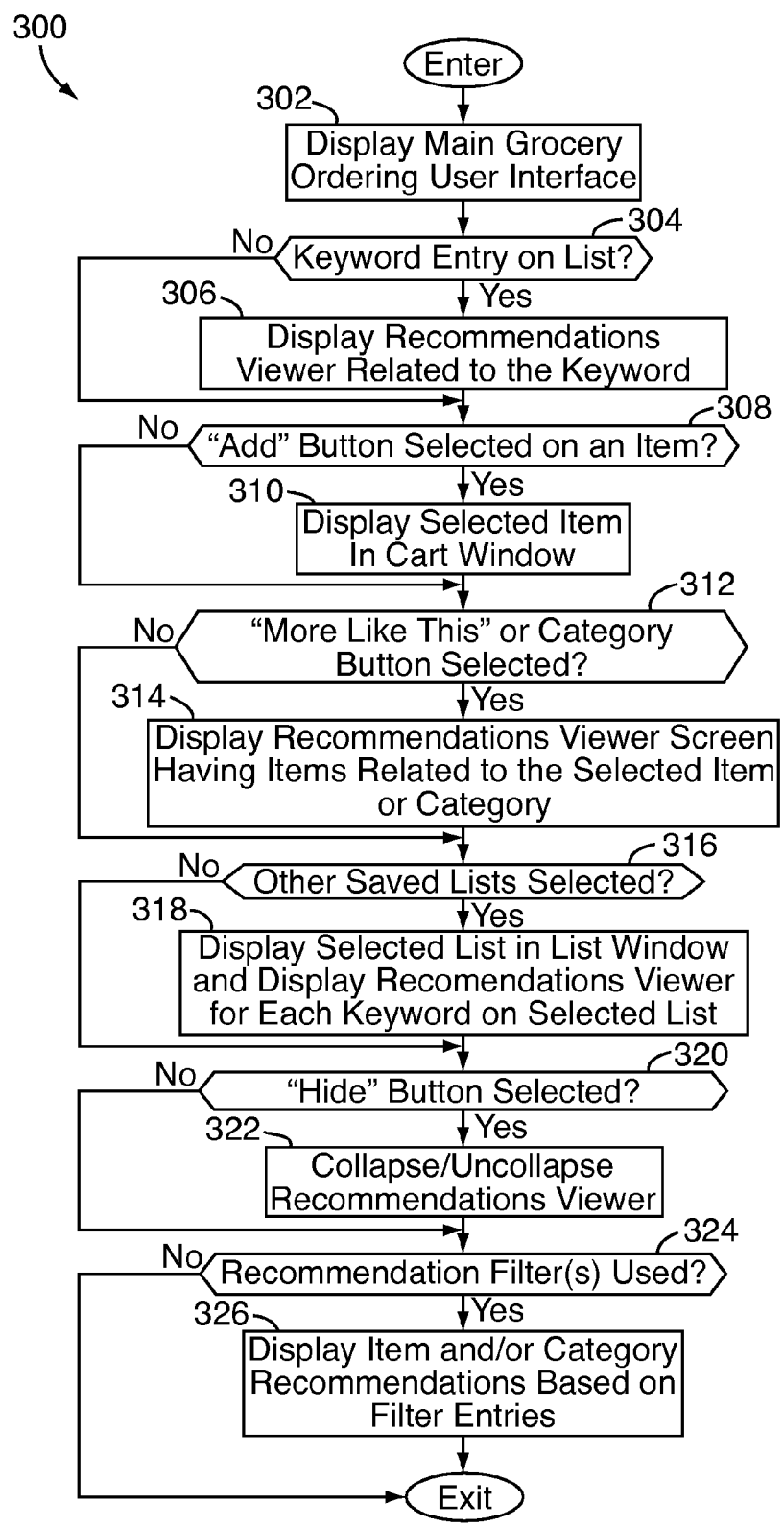
FIG. 8 is a flow diagram showing a top level flow for product ordering, in accordance with embodiments of the present disclosure.

Referring to FIG. 8, a high level flow chart 300 illustrates one embodiment of a process for implementing the system and method of the present disclosure. The process begins at block 302, which displays the main grocery ordering user interface 50 (FIG. 2). Next a step 304 determines if the customer 10 has entered a keyword on the grocery list window 52 (FIG. 2). If yes, block 306 displays the recommendations viewer 66-70 (FIG. 2) having categories (or clusters) relating to the keyword entered in the shopping list window 52 or having items indicative of such categories (or clusters), discussed more hereinafter with FIG. 9.

After block 306, or if the result of block 304 is no, block 308 determines if the "Add" (or "Add to Cart") button 96 (FIG. 2) has been selected on an item in the viewer 66-70. If yes, block 310 displays the selected item in the cart window 56 (FIG. 2). After block 310, or if the result of block 308 is no, block 312 determines if the "More like this" button 98 on an item in the viewer 66-70 (FIG. 2) or one of the category buttons 220 in the text clouds 222,230 (FIGS. 6,7) has been selected. If yes, block 314 displays the recommendations viewer having items related to the selected item or category.

After block 314, or if the result of block 312 is no, block 316 determines whether other saved lists have been selected. If yes, block 318 displays the selected list of keywords in the list window 52 (FIG. 2) and displays the recommendations viewer for each keyword on the list. After block 318, or if the result of block 316 is no, block 320 determines if the "Hide" button 119 is selected. If yes, block 322 collapses or uncollapses (expands) the recommendations viewers 66-70 as appropriate. After block 322 or if the result of block 320 is no, block 324 determines if one of the recommendations filters 114,116 (FIG. 2) has been used. If yes, block 326 displays item and/or category recommendations based on filter entries as discussed hereinbefore with FIG. 2. After block 326, or if the result of block 324 is no, the process 300 exits.

Figure 9:
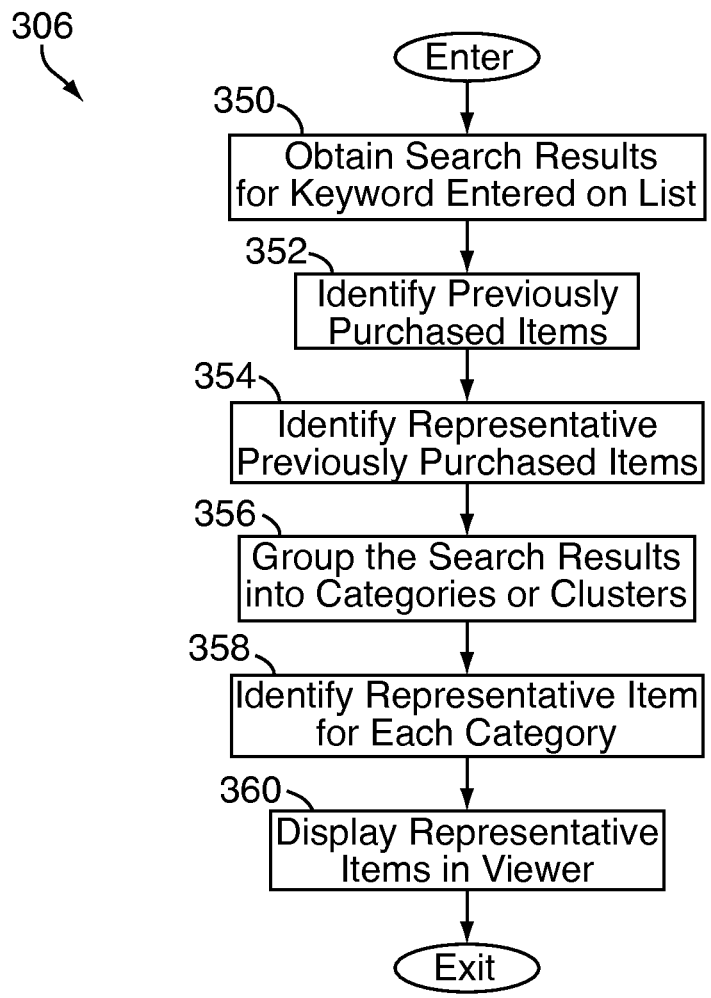
FIG. 9 is a flow diagram showing a top level flow for displaying a recommendations viewer, in accordance with embodiments of the present disclosure.

Referring to FIG. 9, block 306 of FIG. 8 may be performed by a process that begins at block 350 where search results items are obtained for the keyword on the shopping list 58 (FIG. 2). Next block 352 identifies all previously purchased items from the merchant from the search results. Next, block 354 identifies representative previously purchased items. Next a step 356 groups the search results items into categories or clusters. Next, block 358 identifies a representative item for each category for the viewer 66-70. Next, block 360 displays the representative items in the corresponding viewer 66-70. The representative item for each category or cluster in the viewer 66-70 may be selected by identifying the item in the group that has the most sales, or is the most closely related to the keyword, or other technique for selecting a representative item for the category or cluster.

The search results items may be provided by any keyword search engine and the groups in categories or clusters of the search results items may be obtained using any one or more or combination of the techniques relating to clustering, similarities, substitutes and/or replacements of items, such as is discussed in the copending U.S. patent application Ser. No. 11/693,063, entitled "Method and System for Providing Item Recommendations", filed Mar. 29, 2007; Ser. No. 11/616,163, entitled "Method and System for Providing Suitable Replacement Items For On-Line Shopping", filed Dec. 26, 2006; Ser. No. 11/694,757, entitled "Processes For Calculating Item Distances and Performing Item Clustering", filed Mar. 30, 2007; and Ser. No. 11/694,707, entitled "Cluster-Based Assessment of User Interests", filed Mar. 30, 2007, each of which is incorporated herein by reference in its entirety, or any other technique for grouping or clustering of similar items from a list of search result items.

As used herein, the term "list" includes, but is not limited to any list, group, set, or collection of two or more items. The items in a list may be displayed on one or more separate screens or web pages. The number of screens and the number of items on each screen depends on the format and content of the items and the customer web browser. The list may be in any format, including text and/or images, or any other format and it is not necessary that the items be displayed in any prioritized manner within the list or grouping, unless otherwise required as stated herein.

Although the links discussed herein may link to another web page (or screen or window), according to some embodiments, the links may be buttons that, when selected, call for the display of corresponding information within the same web page (e.g. using a Flash, AJAX, or other interface that may not require redirection to another information page).

Although the disclosure has been described herein using exemplary techniques, algorithms, and/or processes for implementing the present disclosure, it should be understood by those skilled in the art that other techniques, algorithms and processes or other combinations and sequences of the techniques, algorithms and processes described herein may be used or performed that achieve the same function(s) and/or result(s) described herein and which are included within the scope of the present disclosure.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods described herein in which functions may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

At least the following is claimed:

1. A computer-implemented method comprising:
   providing a shopping list to a computing device for display on a first portion of a web page displayed on a display screen of the computing device, wherein the shopping list includes a plurality of keywords provided by a customer;
   obtaining a plurality of groups of search results items relating to at least two of the plurality of keywords;
   grouping, by at least one computer processor, each of the groups of search results items into clusters of items determined to be similar within each of the groups;
   identifying, by the at least one computer processor, a representative item from each of the clusters of items determined to be similar;
   providing a set of representative items to the computing device for display within a viewer on a second portion of the web page, wherein the set comprises at least some of the representative items from each of the clusters of items determined to be similar;
   receiving an interaction with a link associated with the viewer, wherein the interaction is provided by the customer;
   determining a price range based at least in part on the interaction with the link;
   updating the set of representative items based at least in part on the interaction with the link, wherein the updated set of representative items includes representative items having prices within the price range; and
   providing the updated set of representative items to the computing device for display within the viewer on the second portion of the web page without reloading the web page in its entirety.

2. The computer-implemented method of claim 1, further comprising:
   receiving a selection of one of the representative items of the updated set corresponding to one of the clusters of items determined to be similar; and
   providing a plurality of the search results items associated with the selected one of the representative items corresponding to the one of the clusters of items determined to be similar to the computing device for display in the viewer on the second portion of the web page.

3. The computer-implemented method of claim 2, further comprising:
   receiving a selection of one of the plurality of search results items provided to the computing device for display in the viewer on the second portion of the web page; and
   providing the selected item to the computing device for display on a third portion of the web page.

4. The computer-implemented method of claim 1, wherein the link is a price selector.

5. The computer-implemented method of claim 1, wherein at least one of the keywords is indicative of at least one consumable item selected from the group consisting of: a grocery item, a health item, a beauty item, an office supply, a pet care item, an auto care item and an industrial supply.

6. A computer-implemented method comprising:
   receiving information regarding a plurality of different keywords entered on a first portion of a first information page from a first server, wherein each of the different keywords is entered on the first portion by a customer;
   obtaining a plurality of groups of search results items by at least one computer processor, wherein at least one of the search results items in each of the groups is associated with a corresponding one of the different keywords;
   providing the at least one of the search results items in each of the groups to the computing device for display on a second portion of the first information page;
   grouping each of the groups of search results items into categories of items determined to be similar within each of the groups;
   receiving information regarding an interaction with a filtering link associated with one of the categories, wherein the interaction with the filtering link is entered by the customer; and
   obtaining updated search results items for the one of the categories by the at least one computer processor without interacting with a second information page or a second server;
   providing the updated search results items for the one of the categories to the computing device for display on the second portion of the first information page,
   wherein providing the at least one of the search results items in each of the groups to the computing device for display on the second portion of the first information page comprises:
   providing a representative item from each of the categories to the computing device for display on the second portion of the first information page without reloading the first information pale in its entirety.

7. The computer-implemented method of claim 6, further comprising:
receiving a selection of one of the representative items as a selected representative item by the customer; and
providing a plurality of specific items associated with the selected representative item to the computing device for display on the second portion of the first information page.

8. The computer-implemented method of claim 7, further comprising:
receiving a selection of one of the plurality of specific items as a selected item by the customer; and
providing the selected item to the computing device for display on a third portion of the information page.

9. A computer-implemented method comprising:
receiving a plurality of different keywords;
providing at least some of the plurality of different keywords to a computing device for display in a first window of a first information page on a display screen;
obtaining, by at least one computer processor, a plurality of groups of search results items relating to each of the plurality of different keywords;
grouping, by the at least one computer processor, the groups of the search results items into categories of items determined to be similar within the groups;
identifying, by the at least one computer processor, a representative item from at least one of the categories of items determined to be similar;
providing at least some of the categories to the computing device for display in a second window of the first information page on the display screen;
receiving a selection of at least one of the categories as a selected category;
providing a set of search results items associated with the selected category to the computing device for display in a third window of the first information page on the display screen;
receiving an interaction with a filter associated with the third window;
updating the set of search results items in response to the interaction with the filter; and
providing the updated set of search results items associated with the selected category to the computing device for display in the third window without reloading the first information page in its entirety.

10. The computer-implemented method of claim 9, further comprising:
receiving a selection of at least one of the updated set of search results items as a selected item; and
providing the selected item to the computing device for display in the third window.

11. The computer-implemented method of claim 10, wherein the different keywords, the categories, and the selected item are provided for display in the first information page on the display screen at the same time.

12. The computer-implemented method of claim 10, wherein the different keywords, the updated set of search results items and the selected item are provided for display in the first information page on the display screen at the same time.

13. The computer-implemented method of claim 9, wherein the filter is at least one of a price selector, a brand selector or an attribute selector.

14. The computer-implemented method of claim 9, wherein at least one of the plurality of different keywords is indicative of at least one consumable item selected from the group consisting of: a grocery item, a health item, a beauty item, an office supply, a pet care item, an auto care item and an industrial supply.

15. The computer-implemented method of claim 9, wherein the at least some of the categories are provided for display in at least one of a text cloud or a plurality of item viewers, and
wherein at least one of the item viewers corresponds to one of the keywords.

16. The computer-implemented method of claim 15, wherein the plurality of item viewers comprises a slide show viewer.

17. The computer-implemented method of claim 9, wherein providing the at least some of the categories to the computing device for display in the second window of the first information page on the display screen comprises:
providing a representative item from the search results items corresponding to each of the categories to the computing device for display on the display screen.

18. A method comprising:
providing a plurality of keywords to a computing device for display in a web page on a screen, wherein each of the keywords is received from a customer;
obtaining a plurality of groups of search results items relating to each of the keywords;
grouping each of the groups of the search results items into categories of items determined to be similar within each of the groups;
identifying, by the at least one computer processor, a representative item from at least one of the categories of items determined to be similar;
providing at least some of the categories to the computing device for display in the web page on the screen concurrently with the keywords;
receiving a selection of at least one of the categories as a selected category from the customer;
providing a set of specific items from the search results items associated with the selected category to the computing device for display in the web page on the screen concurrently with the keywords;
receiving an interaction with a filter associated with the selected category;
updating the set of specific items in response to the interaction with the filter;
providing the updated set of specific items from the search results items associated with the selected category to the computing device for display in the web page on the screen concurrently with the keywords without reloading the web page in its entirety;
receiving a selection of at least one specific item of the updated set of specific items as a selected item from the customer; and
providing information regarding the selected item to the computing device for display in the web page on the screen concurrently with the keywords.

19. A computer system comprising:
at least one memory configured to at least store specific computer-executable instructions; and
at least one processor in communication with the at least one memory, the at least one processor configured to execute the specific computer-executable instructions to at least:
receive a plurality of keywords entered in a window of a web page on a screen by a customer;
obtain a plurality of groups of search results items relating to each keyword of the plurality of keywords;

group each of the groups of the search results items into categories of items determined to be similar within each of the groups;

identify, by the at least one computer processor, a representative item from at least one of the categories of items determined to be similar;

provide at least some of the categories for display in the web page on the screen concurrently with the keywords;

receive a selection of at least one of the categories as a selected category by the customer;

provide a first plurality of specific items from the search results items associated with the selected category for display in the web page on the screen concurrently with the keywords;

receive a selection of at least one of a brand, a price range or an attribute by the customer; and in response to the selection of the at least one of the brand, the price range or the attribute, provide a second plurality of specific items from the search results items associated with the selected category for display in the web page on the screen concurrently with the keywords without reloading the web page in its entirety, wherein each of the second plurality of specific items is one of the first plurality of items, and wherein each of the second plurality of items is one of the brand, has a price within the price range or has the attribute.

20. The computer system of claim 19, wherein the at least one processor is further configured to execute the specific computer-executable instructions to at least:

receive a selection of at least one of the specific items as a selected item by the customer; and provide the selected item for display in the web page on the screen concurrently with the keywords in response to the selection of the at least one of the specific items as the selected item.

21. The computer-implemented method of claim 6, wherein the filtering link is one of:

a brand selector;

a price range selector; or an attribute selector.

22. The computer-implemented method of claim 21, wherein the interaction with the filtering link is one of:

a selection of a brand via the brand selector;

a selection of at least one of a minimum price or a maximum price via the price range selector; or a selection of at least one of an age, a gender, a size or an ingredient via the attribute selector.

23. The computer-implemented method of claim from 9, wherein providing the at least some of the categories to the computing device for display in the second window of the first information page on the display screen further comprises:

providing a plurality of tabs to the computing device for display in association with the second window, wherein each of the plurality of tabs corresponds to one of the at least some of the categories, and wherein receiving the selection of the at least one of the categories as the selected category further comprises:

receiving a selection of one of the plurality of tabs as a selected tab, wherein the selected tab corresponds to the selected category.

\* \* \* \* \*